US012575668B2

(12) United States Patent
Liu

(10) Patent No.: US 12,575,668 B2
(45) Date of Patent: Mar. 17, 2026

(54) MULTI-SENSORY GAMING DESK WITH AUDIO-VISUAL SYNCHRONIZATION SYSTEM

(71) Applicant: Changsha Xinmuyouju Supply Chain Management Service Co., Ltd, Changsha (CN)

(72) Inventor: Zhaona Liu, Changsha (CN)

( * ) Notice: Subject to any disclaimer, the term of this patent is extended or adjusted under 35 U.S.C. 154(b) by 0 days.

(21) Appl. No.: 19/314,244

(22) Filed: Aug. 29, 2025

(65) Prior Publication Data

US 2025/0380799 A1 Dec. 18, 2025

(51) Int. Cl.

| | |
|---|---|
| ***A47B 37/00*** | (2006.01) |
| ***F21S 4/20*** | (2016.01) |
| ***F21Y 115/10*** | (2016.01) |
| ***H04R 1/02*** | (2006.01) |
| ***H04R 1/08*** | (2006.01) |
| ***H04R 3/00*** | (2006.01) |
| ***H05B 47/12*** | (2020.01) |

(52) U.S. Cl.

CPC ................ *A47B 37/00* (2013.01); *F21S 4/20* (2016.01); *H04R 1/028* (2013.01); *H04R 1/08* (2013.01); *H04R 3/00* (2013.01); *H05B 47/12* (2020.01); *A47B 2200/008* (2013.01); *A47B 2220/0077* (2013.01); *F21Y 2115/10* (2016.08)

(58) Field of Classification Search

CPC .............. A47B 37/00; A47B 2200/008; A47B 2220/0077; F21S 4/20; H04R 1/028; H04R 1/08; H04R 3/00; H05B 47/12; F21Y 2115/10

See application file for complete search history.

(56) References Cited

U.S. PATENT DOCUMENTS

| | | | | |
|---|---|---|---|---|
| 5,586,936 A * | 12/1996 | Bennett | G07F 17/32 | 463/25 |
| 6,179,710 B1 * | 1/2001 | Sawyer | A63F 3/00157 | 463/16 |
| 6,688,597 B2 * | 2/2004 | Jones | A63F 3/00157 | 463/16 |
| 7,306,516 B2 * | 12/2007 | Iosilevsky | G07F 17/32 | 463/13 |
| 7,377,857 B2 * | 5/2008 | Nottage | A63D 15/00 | 473/29 |

(Continued)

*Primary Examiner* — Oyesola C Ojo

(74) *Attorney, Agent, or Firm* — Daniel M. Cohn; Howard M. Cohn

(57) ABSTRACT

The present disclosure belongs to the technical field of furniture, in particular to a multi-sensory gaming desk with an audio-visual synchronization system, comprising a desktop assembly, including a desktop panel and light guide grooves arranged along edges of the desktop panel; LED light strips embedded in the light guide grooves; and a control switch. The present disclosure realizes a 270° surrounding light effect through the design of U-shaped three-sided LED light strips, and achieves the music rhythm response by combining the voice-controlled pickup circuit with the light strip control IC, and the light can dynamically change with the audio rhythm. The combination of the ergonomic inclined control panel with the three-key physical switch is adopted to facilitate switching between multiple color modes and pickup direction modes.

3 Claims, 9 Drawing Sheets

(56) References Cited

U.S. PATENT DOCUMENTS

| | | | | |
|---|---|---|---|---|
| 7,611,417 | B2 * | 11/2009 | Murrey | A63D 15/00<br>473/4 |
| 7,690,996 | B2 * | 4/2010 | Iddings | G07F 17/32<br>463/9 |
| 8,480,091 | B1 * | 7/2013 | Florence | A63F 3/00261<br>273/309 |
| 10,124,240 | B2 * | 11/2018 | Parvanta | A63F 7/36 |
| 2004/0070149 | A1 * | 4/2004 | Lipscomb | A47B 25/00<br>273/309 |
| 2004/0160005 | A1 * | 8/2004 | Krise | A63F 1/06<br>273/274 |
| 2007/0045959 | A1 * | 3/2007 | Soltys | G07F 17/322<br>273/274 |
| 2007/0293311 | A1 * | 12/2007 | Walker | G07F 17/32<br>463/29 |
| 2009/0131186 | A1 * | 5/2009 | Martin | G07F 17/38<br>473/24 |
| 2009/0143141 | A1 * | 6/2009 | Wells | G07F 17/3239<br>463/37 |
| 2009/0191933 | A1 * | 7/2009 | French | A63F 1/18<br>463/46 |
| 2009/0325686 | A1 * | 12/2009 | Davis | G07F 17/32<br>463/25 |
| 2020/0105087 | A1 * | 4/2020 | Ikeda | G07F 17/3213 |
| 2021/0093947 | A1 * | 4/2021 | Adda | G06F 3/041 |
| 2023/0284774 | A1 * | 9/2023 | Hu | A63F 13/215 |

* cited by examiner

MULTI-SENSORY GAMING DESK WITH AUDIO-VISUAL SYNCHRONIZATION SYSTEM

The present disclosure relates to the technical field of furniture, in particular to a multi-sensory gaming desk with an audio-visual synchronization system.

BACKGROUND

With the increasing integration of modern office and entertainment needs, gaming desks have evolved beyond mere platforms for computers and peripherals. They are progressively transforming into smart furniture that combines functionality, aesthetics, and personalization. Particularly in scenarios such as gaming, esports, and remote work, users now demand more sophisticated ambient environments. As a result, smart LED gaming desks, which integrate lighting, decorative, and interactive features, are gaining growing popularity in the market.

A significant number of LED gaming desks currently available on the market adopt a structure with a single illumination zone positioned along the desk edge or underneath the desktop. The design offers limited LED light effects, lacking dynamic variation and user interactivity. To enhance the visual appeal and interactive experience of gaming desks, some products have begun to incorporate music-synchronized functionality. This is achieved through built-in audio sensors or external audio inputs, enabling LED lights to dynamically respond to and change with musical rhythms.

However, music-responsive algorithms employed in existing technologies remain relatively simplistic. There is a notable lack of high fidelity between the light effects and the actual audio rhythm. Furthermore, the integration between the light control module and the audio processing module is often insufficient, resulting in slow system response, high power consumption, and poor stability.

In addition, in terms of structural design, traditional LED light strips are typically mounted by being affixed to the surface of the desktop or concealed within the sub-structure, which renders them susceptible to physical impact and dust accumulation. Moreover, the resulting light effect is constrained by the limited mounting options, failing to achieve uniform and aesthetically pleasing illumination. Consequently, the overall use effect is often unsatisfactory.

Therefore, a multi-sensory gaming desk with an audio-visual synchronization system is provided to solve the above problems.

SUMMARY OF THE APPLICATION

I. Technical Problems Solved

In response to the deficiencies of the prior art, the present disclosure provides a multi-sensory gaming desk with an audio-visual synchronization system, which solves the problems proposed in the above background technology that the mounting structure is easily affected by physical impact or dust accumulation, and has poor light effects and appearance.

II. Technical Solutions

In order to achieve the above objective, the present disclosure specifically adopts the following technical solutions:

A multi-sensory gaming desk with an audio-visual synchronization system, comprising:

a desktop assembly including a desktop panel and light guide grooves arranged along edges of the desktop panel;

LED light strips embedded in the light guide grooves; and a control switch internally provided with a circuit board integrated with a light strip control IC, a microphone, a light effect mode key group, and a voice-controlled pickup circuit, wherein the circuit board is electrically connected to the LED light strips.

In some embodiments, the light guide grooves are arranged along left and right sides and a front side of the desktop panel, and the light guide grooves and the LED light strips are both U-shaped.

In some embodiments, connections between the left and right sides and the front side of the desktop panel are respectively provided with a transition chamfer, and the LED light strip is provided with an arc portion with a same curvature radius in a corresponding chamfer region, and a central angle of the arc portion matches a turning angle of the transition chamfer.

In some embodiments, two ends of the LED light strip extend to connections between the left and right sides and a rear side of the desktop panel, and the connections are respectively provided with a corner brace.

In some embodiments, the LED light strip includes a silicone sleeve and a plurality of lamp beads connected in series inside the silicone sleeve, and a count of the lamp beads arranged in each meter of the silicone sleeve is not less than thirty-six.

In some embodiments, the control switch includes a control panel, one side of the control panel is an inclined surface, and a COLOR key, a POWER key, and a MODE key corresponding to the light effect mode key group are provided on the inclined surface, at least two screw holes are provided on a top of the control panel for screwing the control panel to fix the control panel to a bottom of the desktop panel, and a plurality of blue LED lamps are integrated on the circuit board.

In some embodiments, the voice-controlled pickup circuit includes a power input module, an electroacoustic conversion module, an amplifier module, a power filter module, and an output drive module;

the power input module includes a positive terminal V33 and a ground terminal GND;

the electroacoustic conversion module is composed of the microphone MIC, a positive electrode of which is connected to the V33 via a first bias resistor R1, and a negative electrode of which is grounded via a first load resistor R6;

the amplifier module includes a primary amplifier unit and a secondary amplifier unit;

the power filter module includes a decoupling resistor R1 provided between the V33 power supply and a power supply node of the amplifier module and configured to suppress a high-frequency interference of a power supply circuit;

the output drive module is connected to a collector output end of Q1 and configured to drive a voice-controlled light emitting unit LED.

In some embodiments, the primary amplifier unit is composed of an NPN transistor Q2, a base of which is connected to a common node of the microphone MIC and R3, and a collector of which is connected to the V33 via a second bias resistor R7;

the secondary amplifier unit is composed of an NPN transistor Q1, a base of which is connected to the collector of the Q2 via a third bias resistor R9, and an emitter of which is grounded via a current feedback resistor R6.

In some embodiments, the multi-sensory gaming desk with the audio-visual synchronization system further comprises a support frame, wherein the support frame includes two I-shaped brackets symmetrically arranged on a bottom of the desktop panel, and a connecting rod is provided between top ends of the two I-shaped brackets.

In some embodiments, one side of the I-shaped bracket is provided with a diagonal brace with one end fixedly connected to the bottom of the desktop panel, and opposite surfaces of the two I-shaped brackets are respectively provided with a cup holder and a hook, and two ends of a bottom the I-shaped bracket are provided with foot pads.

III. Beneficial Effects

Compared with the prior art, the present disclosure provides the multi-sensory gaming desk with the audio-visual synchronization system, which has the following beneficial effects.

The present disclosure realizes a 270° surrounding light effect through the design of U-shaped three-sided LED light strips, and achieves the music rhythm response by combining the voice-controlled pickup circuit with the light strip control IC, and the light can dynamically change with the audio rhythm. The combination of the ergonomic inclined control panel with the three-key physical switch is adopted to facilitate switching between multiple color modes and pickup direction modes. The design of the LED light strips embedded in the light guide grooves combined with the transition chamfers and the arc portions can effectively reduce physical impact while avoiding dust accumulation, thereby improving the overall appearance. The structure of the I-shaped brackets and the diagonal braces integrates cup holder and hook functions while ensuring load-bearing stability. This product combines smart light interaction with practical storage features, providing users with an immersive light environment experience and convenient operation.

Figure 1:
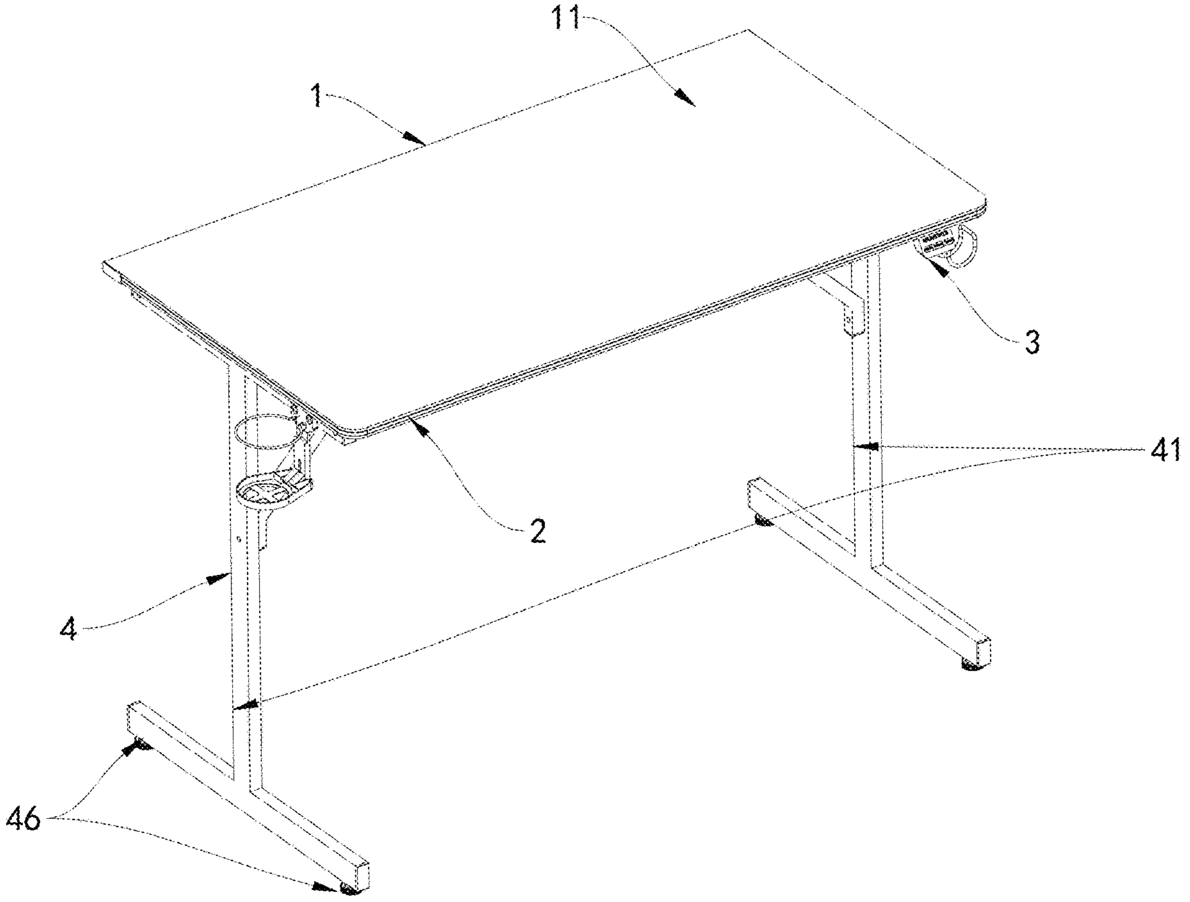
FIG. 1 is a schematic structural diagram showing a combination of a desktop assembly and a support frame of the present disclosure.

Reference signs in the figures: 1. desktop assembly; 11. desktop panel; 12. light guide groove; 13. transition chamfer; 14. corner brace; 2. LED light strip; 21. silicone sleeve; 22. lamp bead; 23. arc portion; 3. control switch; 31. control panel; 311. screw holes; 32. circuit board; 33. light strip control IC; 34. microphone; 35. Light effect mode key group; 36. blue LED lamp; 37. COLOR key; 38. POWER key; 39. MODE key; 4. support frame; 41. I-shaped bracket; 42. connecting rod; 43. diagonal brace; 44. cup holder; 45. hook; 46. foot pad.

DETAILED DESCRIPTION

The following will clearly and completely describe the technical solution of the embodiments of the present disclosure with reference to the accompanying drawings in the embodiments of the present disclosure. Obviously, the described embodiments are only a part of the embodiments of the present disclosure, but not all the embodiments. Based on the embodiments of the present disclosure, all other embodiments obtained by those having ordinary skills in the art without making any creative efforts fall within the scope of protection of the present disclosure.

EMBODIMENTS

As shown in FIGS. 1-9, a multi-sensory gaming desk with an audio-visual synchronization system according to one embodiment of the present disclosure includes:

- a desktop assembly 1 including a desktop panel 11 and light guide grooves 12 arranged along edges of the desktop panel 11;
- LED light strips 2 embedded in the light guide grooves 12; and
- a control switch 3 internally provided with a circuit board 32 integrated with a light strip control IC 33, a microphone 34, a light effect mode key group 35, and a voice-controlled pickup circuit, the circuit board 32 being electrically connected to the LED light strips 2.

The present disclosure realizes a 270° surrounding light effect through the design of U-shaped three-sided LED light strips 2, and achieves the music rhythm response by combining the voice-controlled pickup circuit with the light strip control IC, and the light can dynamically change with the audio rhythm. The combination of the ergonomic inclined control panel 31 with the three-key physical switch is adopted to facilitate switching between multiple color modes and pickup direction modes. The design of the LED light strips 2 embedded in the light guide grooves 12 combined with the transition chamfers 13 and the arc portions 23 can effectively reduce physical impact while avoiding dust accumulation, thereby improving the overall appearance. The structure of the I-shaped brackets 41 and the diagonal braces 43 integrates cup holder 44 and hook 45 functions while ensuring load-bearing stability. This product combines smart light interaction with practical storage features, providing users with an immersive light environment experience and convenient operation.

As shown in FIGS. 1-4, in some embodiments, the light guide grooves 12 are arranged along left and right sides and a front side of the desktop panel 11, and the light guide grooves 12 and the LED light strips 2 are both U-shaped.

A rear side of the desktop panel 11 is against the wall and no light display is required, so the light guide groove 12 and the LED light strip 2 are not provided. This design avoids waste and is more energy-efficient. The light guide grooves 12 and the LED light strips 2 are both U-shaped. After the LED light strips 2 are turned on, the light forms a 270° surrounding light field, enhancing the atmosphere.

As shown in FIGS. 1-4, in some embodiments, connections between the left and right sides and the front side of the desktop panel 11 are respectively provided with a transition chamfer 13, and the LED light strip 2 is provided with an arc portion 23 with a same curvature radius in a corresponding chamfer region, and a central angle of the arc portion 23 matches a turning angle of the transition chamfer 13.

The transition chamfer 13 of the desktop panel 11 is designed to match the arc portion 23 of the LED light strip 2. A light spot speckle caused by right-angle mounting is eliminated based on the deformation characteristics of the silicone sleeve 21, thereby achieving seamless light effect transition. After the LED light strips 2 are assembled with the light guide grooves 12, they form a whole with the desktop panel 11, improving the overall appearance of the gaming desk. The design of the transition chamfer avoids injuries to users and makes it safer to use.

As shown in FIGS. 1-4, in some embodiments, two ends of the LED light strip 2 extend to connections between the left and right sides and the rear side of the desktop panel 11, and the connections are respectively provided with a corner brace 14.

The two ends of the LED light strip 2 extend into the corner brace 14 and are fixed thereto. The corner brace 14 is fixed to the connections between the left and right sides and the rear side of the desktop panel 11 by screws. The setting of the corner brace 14 ensures the assembly stability of the LED light strips 2 while shielding and decorating the ends of the LED light strips 2, further improving the overall appearance of the gaming desk.

Figure 7:
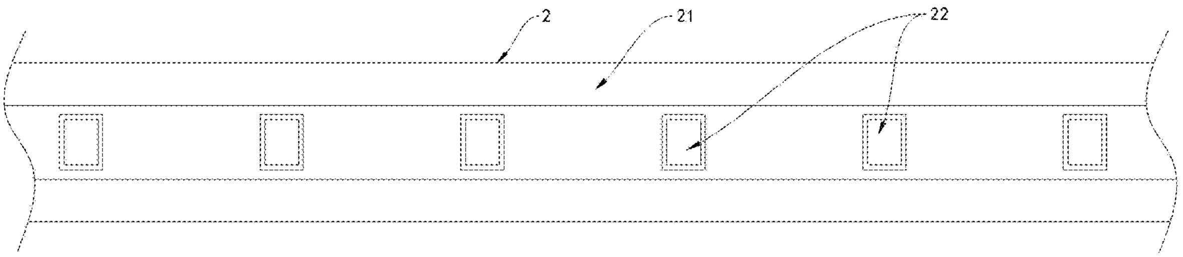
FIG. 7 is a cross-sectional structural diagram showing an LED light strip of the present disclosure.

As shown in FIG. 7, in some embodiments, the LED light strip 2 includes a silicone sleeve 21 and a plurality of lamp beads 22 connected in series inside the silicone sleeve 21, and a count of the lamp beads 22 arranged in each meter of the silicone sleeve 21 is not less than thirty-six.

The silicone sleeve 21 of the LED light strip 2 is made of a high-transmittance material, and a wide-angle mixed light effect is achieved through the densely distributed lamp beads 22, so that the edges of the desktop present uniform light strips, thereby improving the light display effect.

As shown in FIGS. 1-6, in some embodiments, the control switch 3 includes a control panel 31, one side of the control panel 31 is an inclined surface, and a COLOR key 37, a POWER key 38, and a MODE key 39 corresponding to the light effect mode key group 35 are provided on the inclined surface, at least two screw holes 311 are provided on a top of the control panel 31 for screwing the control panel 31 to fix the control panel 31 to a bottom of the desktop panel 11, and a plurality of blue LED lamps 36 are integrated on the circuit board 36.

The inclined layout of the keys of the control panel 31 conforms to the principles of ergonomics. The blue LED indicator light reduces visual interference at night by selecting a specific wavelength, and provides an operation guidance function. When the control panel 31 is connected to a USB interface and powered by 5V of its home device, several blue LED lamps 36 emit blue light, which allows users to easily identify the COLOR key 37, the POWER key 38, and the MODE key 39 at night, and can provide a good atmosphere. After power up, the LED light strips 2 can be controlled to operate by three keys.

Figure 8:
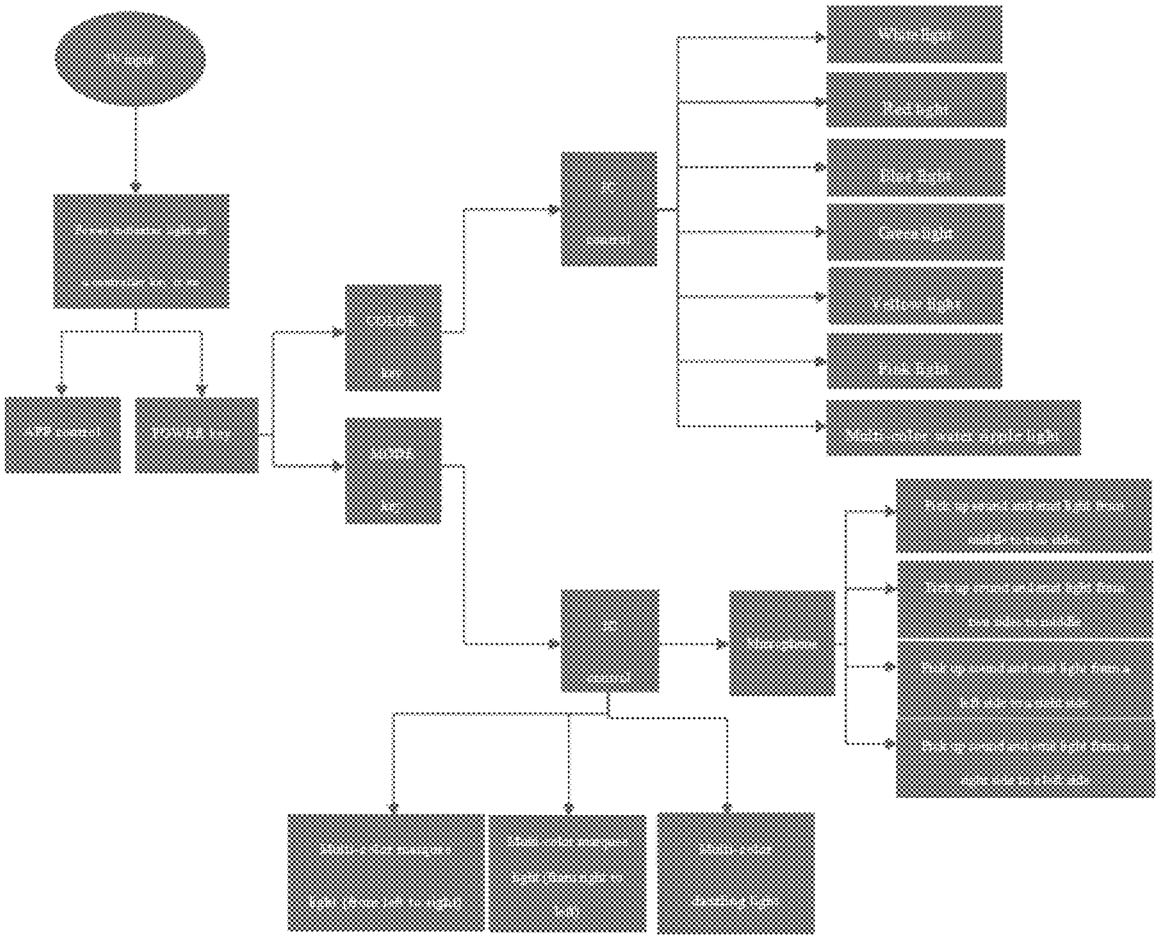
FIG. 8 is a block diagram showing control of a system of the present disclosure.

Referring to FIG. 8, when the control switch 3 is powered on, the blue LED lamps 36 are turned on, and the power on/off is controlled by the POWER key 38;

Press the COLOR key 37, the light strip control IC33 recognizes a signal, at this time the LED light strips 2 emit white light;

Press the COLOR key 37 again, the light strip control IC33 recognizes a signal, at this time the LED light strips 2 emit red light;

Press the COLOR key 37 again, the light strip control IC33 recognizes a signal, at this time the LED light strips 2 emit blue light;

Press the COLOR key 37 again, the light strip control IC33 recognizes a signal, at this time the LED light strips 2 emit green light;

Press the COLOR key 37 again, the light strip control IC33 recognizes a signal, at this time the LED light strips 2 emit yellow light;

Press the COLOR key 37 again, the light strip control IC33 recognizes a signal, at this time the LED light strips 2 emit multi-color water ripple light;

Press the COLOR key 37 again, the light strip control IC33 recognizes a signal, at this time the LED light strips 2 emit white light. Continue to press the COLOR key 37, and the LED light strips 2 cycle through the above lighting sequence.

Press the MODE key 39, the light strip control IC 33 recognizes a microphone 34 MIC signal. After recognizing the microphone 34 MIC signal, the LED light strips 2 pick up sound and emit light from the middle of the front side to the two sides of the desktop panel 11;

Press the MODE key 39, and after the light strip control IC 33 recognizes a microphone 34 signal, the LED light strips 2 pick up sound and emit light from the left and right sides to the middle of the desktop panel 11;

Press the MODE key 39, and after the light strip control IC 33 recognizes a microphone 34 signal, the LED light strips 2 pick up sound and emit light from the left side to the right side of the desktop panel 11;

Press the MODE key 39, and after the light strip control IC 33 recognizes a microphone 34 signal, the LED light strips 2 pick up sound and emit light from the right side to the left side of the desktop panel 11;

Press the MODE key 39, the light strip control IC 33 recognizes a signal, and the LED light strip 2 enters a multi-color marquee mode, and the LED light strips 2 emit light from the right side to the left side of the desktop panel 11;

Press the MODE key 39, the light strip control IC 33 recognizes a signal, and the LED light strips 2 enter a multi-color marquee mode, and the LED light strips 2 emit light from the right side to the left side of the desktop panel 11;

Press the MODE key 39, the light strip control IC 33 recognizes a signal, and the LED light strips 2 enter a multi-color dazzling light mode.

Figure 9:
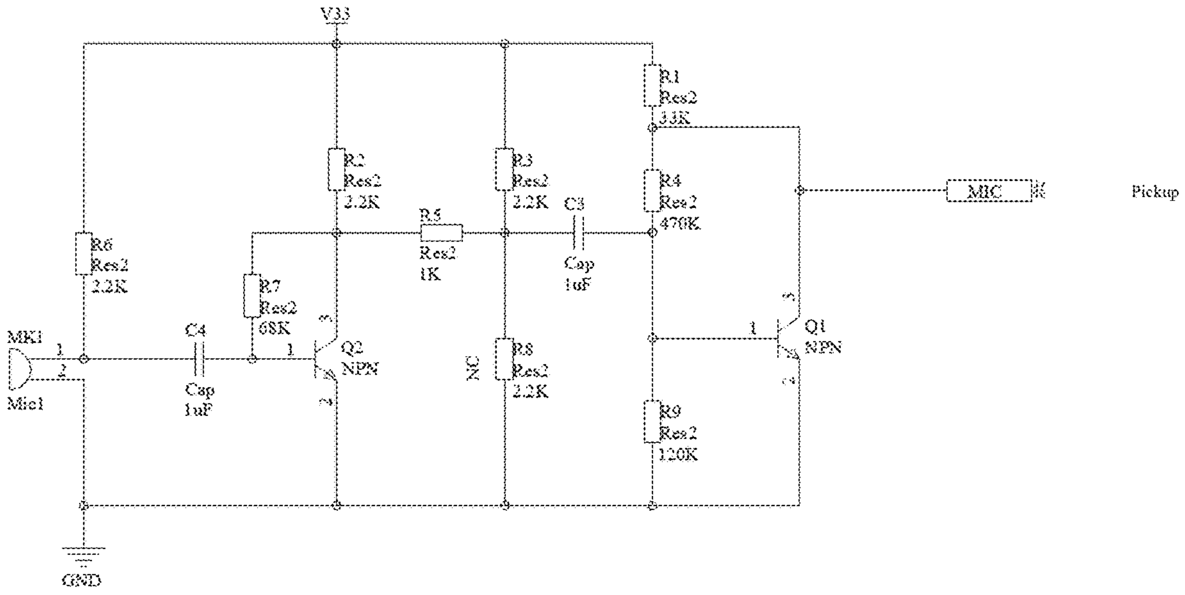
FIG. 9 is a circuit diagram showing a voice-controlled pickup lamp of the present disclosure.

As shown in FIG. 9, in some embodiments, the voice-controlled pickup circuit includes a power input module, an electroacoustic conversion module, an amplifier module, a power filter module, and an output drive module;

The power input module includes a positive terminal V33 and a ground terminal GND;

The electroacoustic conversion module is composed of the microphone 34 MIC, a positive electrode of which is connected to the V33 via a first bias resistor R1, and a negative electrode of which is grounded via a first load resistor R6;

The amplifier module includes a primary amplifier unit and a secondary amplifier unit;

The power filter module includes a decoupling resistor R1 provided between the V33 power supply and a power supply node of the amplifier module and configured to suppress a high-frequency interference of a power supply circuit;

The output drive module is connected to a collector output end of Q1 and configured to drive a voice-controlled light emitting unit LED.

The model of the light strip control IC33 is SN8F5701. The SN8F5701 microcontroller has the following technical advantages in controlling the LED light strips 2:

Built-in enhanced input and output port drive capabilities can directly drive multiple LED light strips, which supports PWM dimming control and achieves 256 levels of smooth brightness adjustment. An integrated music rhythm mode processing unit can analyze audio spectrum characteristics in real time. Hardware acceleration can achieve complex light effects such as colorful gradients and breathing lights. The built-in 5V voltage regulator circuit can directly match the operation voltage of common LED light strips. OTP storage space is provided for saving user-defined light modes. The industrial-grade temperature range (−40° C. to 85° C.) ensures long-term stable operation, effectively reducing BOM costs compared to discrete component solutions.

The 10Ω decoupling resistor R1 achieves 20 dB high-frequency noise suppression. The Q1 collector drive topology reduces the LED response delay to less than 50 ms. The two-stage amplifier unit of the voice-activated pickup circuit uses a hierarchical amplifier architecture consisting of a voltage amplifier stage and a current drive stage, which achieves high-fidelity conversion of sound signals through dynamic range optimization, ensuring that the LED light strips 2 respond in sync with the audio rhythm.

Figure 2:
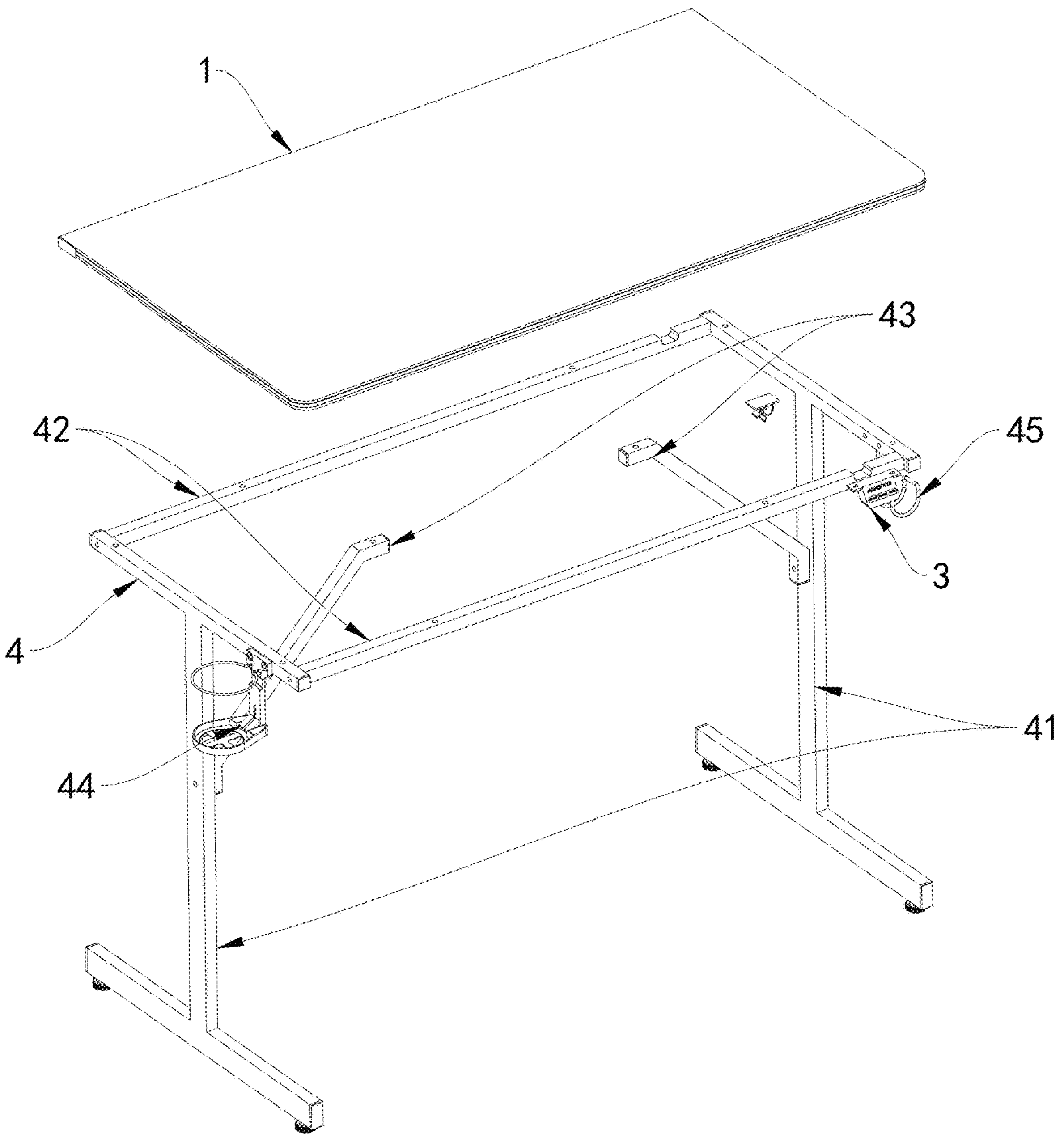
FIG. 2 is a schematic structural diagram showing a support frame of the present disclosure.
Figure 3:
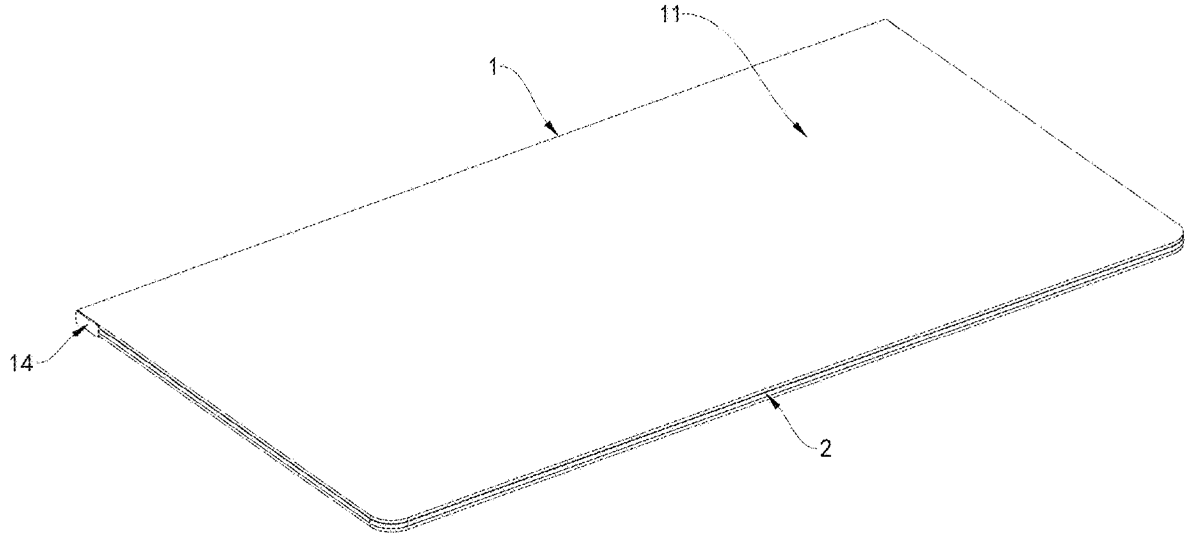
FIG. 3 is a schematic structural diagram showing a desktop assembly of the present disclosure.
Figure 4:
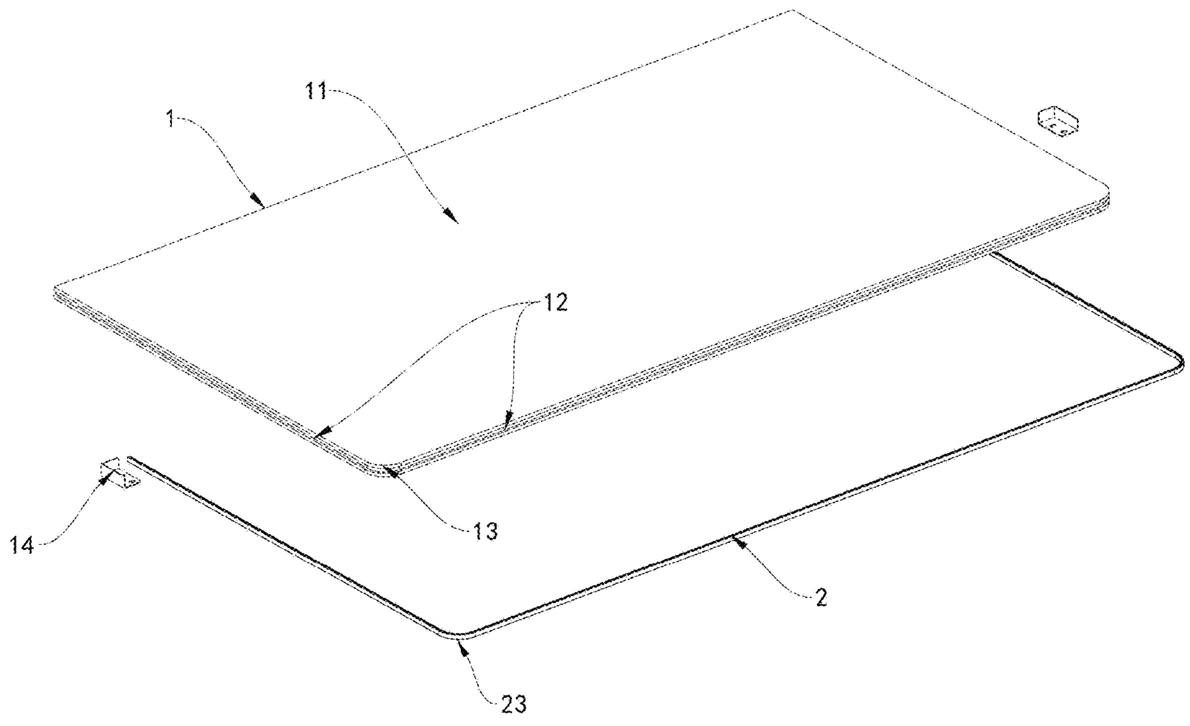
FIG. 4 is an exploded structural diagram showing a desktop assembly of the present disclosure.
Figure 5:
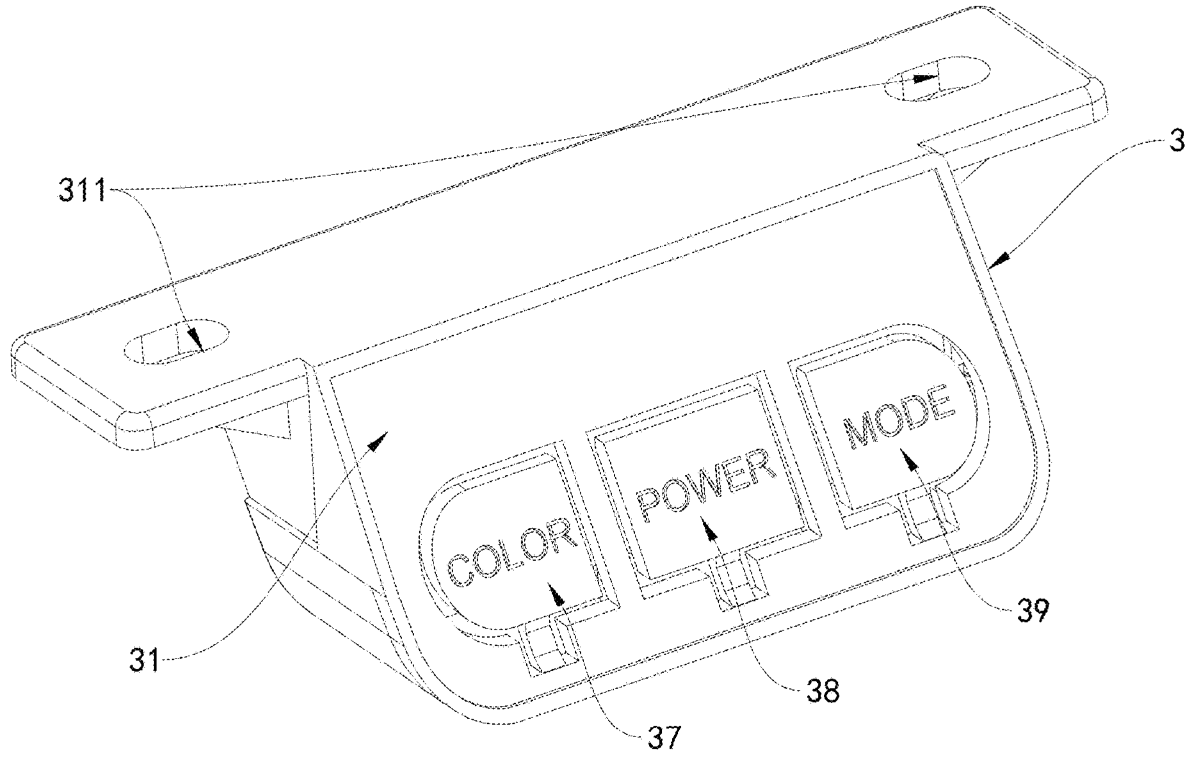
FIG. 5 is a schematic structural diagram showing a control switch of the present disclosure.
Figure 6:
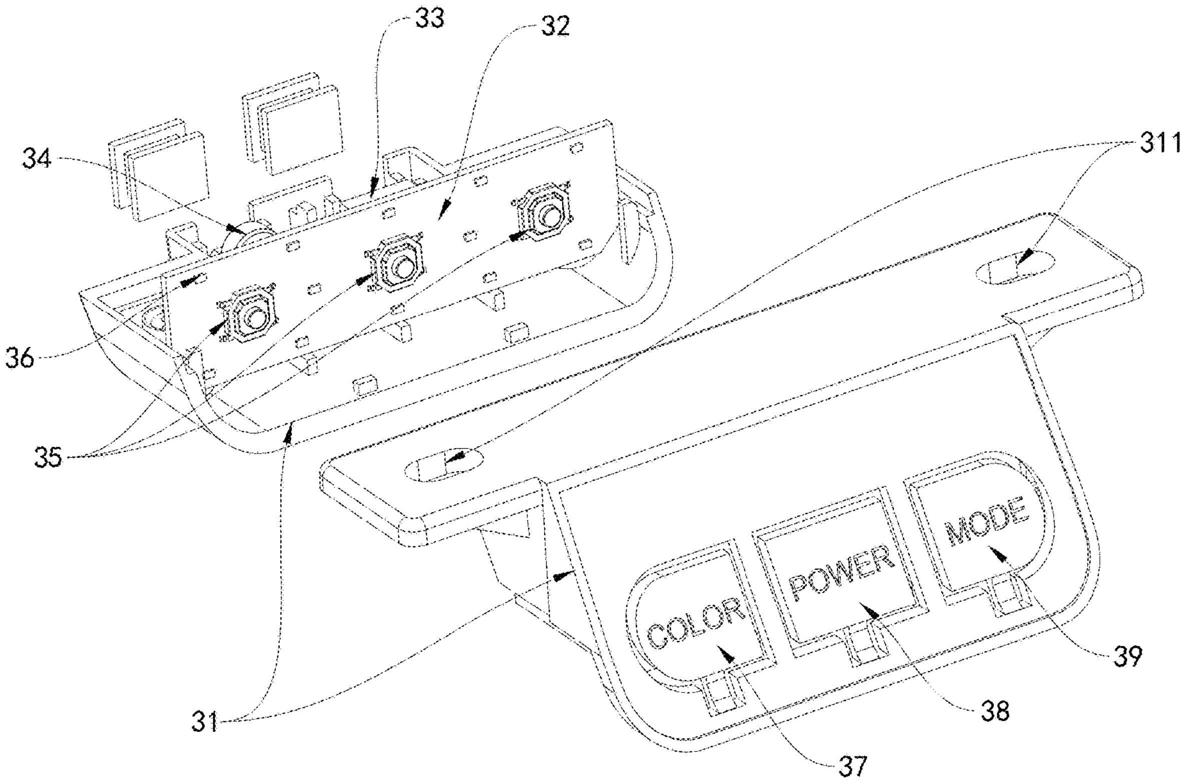
FIG. 6 is an exploded structural diagram showing a control switch of the present disclosure.

As shown in FIGS. 1-3, in some embodiments, the primary amplifier unit is composed of an NPN transistor Q2, a base of which is connected to a common node of the microphone 34 MIC and R3, and a collector of which is connected to the V33 via a second bias resistor R7;

The secondary amplifier unit is composed of an NPN transistor Q1, a base of which is connected to the collector of the Q2 via a third bias resistor R9, and an emitter of which is grounded via a current feedback resistor R6.

The primary amplifier unit is configured to increase a voltage amplitude of the microphone 34MIC signal, and the secondary amplifier unit enhances the load capacity through current drive. The two stages operate together to achieve low-latency sound-light conversion.

As shown in FIGS. 1-3, in some embodiments, the multi-sensory gaming desk with the audio-visual synchronization system further includes a support frame 4. The support frame 4 includes two I-shaped brackets 41 symmetrically arranged on a bottom of the desktop panel 11, and a connecting rod 42 is provided between top ends of the two I-shaped brackets 41.

The I-shaped brackets 41 and the connecting rod 42 form a closed force-bearing ring structure, which improves the overall load-bearing stability through mechanical optimization and can perfectly withstand the load in daily use scenarios. The LED light strips 2 and the control switch 3 adopt the wiring design on the bottom of the desktop panel 11, and the hidden wiring design keeps the appearance neat.

As shown in FIGS. 1-3, in some embodiments, one side of the I-shaped bracket 41 is provided with a diagonal brace 43 with one end fixedly connected to the bottom of the desktop panel 11, and opposite surfaces of the two I-shaped brackets 41 are respectively provided with a cup holder 44 and a hook 45, and two ends of a bottom of the I-shaped bracket 41 are provided with foot pads 46.

The design of the diagonal brace 43 further ensures the stability of the connection between the desktop panel 11 and the I-shaped brackets 41. The design of the cup holder 44 and the hook 45 provides the functions of cup and wire harnesses. The combined design with the diagonal brace 43 provides practical storage functions while ensuring structural strength, which meets the design requirements of multifunctional furniture.

In summary, the present disclosure realizes a 270° surrounding light effect through the design of U-shaped three-sided LED light strips 2, and achieves the music rhythm response by combining the voice-controlled pickup circuit with the light strip control IC33, and the light can dynamically change with the audio rhythm. The combination of the ergonomic inclined control panel 31 with the three-key physical switch is adopted to facilitate switching between multiple color modes and pickup direction modes. The design of the LED light strips 2 embedded in the light guide grooves 12 combined with the transition chamfers 13 and the arc portions 23 can effectively reduce physical impact while avoiding dust accumulation, thereby improving the overall appearance. The structure of the I-shaped brackets 41 and the diagonal braces 43 integrates cup holder 44 and hook 45 functions while ensuring load-bearing stability. The design combines smart light interaction with practical storage features, providing users with an immersive light environment experience and convenient operation.

Finally, it should be noted that the above description is only a preferred embodiment of the present disclosure and is not intended to limit the present disclosure. Although the present disclosure is described in detail with reference to the above embodiments, those skilled in the art can still modify the technical solutions recorded in the above embodiments or replace some of the technical features therein by equivalents. Any modification, equivalent replacement, improvement, etc. made within the spirit and principle of the present disclosure shall be included in the scope of protection of the present disclosure.

The invention claimed is:

1. A multi-sensory gaming desk with an audio-visual synchronization system, comprising:

a desktop assembly (1) including a desktop panel (11) and light guide grooves (12) arranged along edges of the desktop panel (11);

LED light strips (2) embedded in the light guide grooves (12); and a control switch (3) internally provided with a circuit board (32) integrated with a light strip control IC (33), a microphone (34), a light effect mode key group (35), and a voice-controlled pickup circuit;

wherein the circuit board (32) is electrically connected to the LED light strips (2); and wherein the control switch (3) includes a control panel (31) having an inclined surface on one side, a COLOR key (37), a POWER key (38), a MODE key (39) corresponding to the light effect mode key group (35) provided on the inclined surface, at least two screw holes (311) provided on a top of the control panel (31) for screwing the control panel (31) to secure the control panel (31) to a bottom of the desktop panel (11), and a plurality of blue LED lamps (36) integrated on the circuit board (32).

2. The multi-sensory gaming desk with the audio-visual synchronization system of claim 1, wherein:

the voice-controlled pickup circuit includes a power input module, an electroacoustic conversion module, an amplifier module, a power filter module, and an output drive module;

the power input module includes a positive terminal V33 and a ground terminal GND;

the electroacoustic conversion module is composed of the microphone (34) MIC, a positive electrode of which is connected to the V33 via a first bias resistor R1, and a negative electrode of which is grounded via a first load resistor R6;

the amplifier module includes a primary amplifier unit and a secondary amplifier unit;

the power filter module includes a decoupling resistor R1 provided between the V33 power supply and a power supply node of the amplifier module and configured to suppress a high-frequency interference of a power supply circuit; and the output drive module is connected to a collector output end of Q1 and configured to drive a voice-controlled light emitting unit LED.

3. The multi-sensory gaming desk with the audio-visual synchronization system of claim 2, wherein:

the primary amplifier unit is composed of an NPN transistor Q2, a base of which is connected to a common node of the microphone (34) MIC and R3, and a collector of which is connected to the V33 via a second bias resistor R7; and the secondary amplifier unit is composed of an NPN transistor Q1, a base of which is connected to the collector of the Q2 via a third bias resistor R9, and an emitter of which is grounded via a current feedback resistor R6.

* * * * *